United States Patent
Ye et al.

(10) Patent No.: US 7,497,572 B2
(45) Date of Patent: Mar. 3, 2009

(54) TORIC CONTACT LENSES WITH CONTROLLED OPTICAL POWER PROFILE

(75) Inventors: Ming Ye, Fort Worth, TX (US); Joseph Michael Lindacher, Suwanee, GA (US)

(73) Assignee: Novartis AG, Basel (CH)

( * ) Notice: Subject to any disclaimer, the term of this patent is extended or adjusted under 35 U.S.C. 154(b) by 44 days.

(21) Appl. No.: 11/879,167

(22) Filed: Jul. 16, 2007

(65) Prior Publication Data

US 2008/0013043 A1    Jan. 17, 2008

Related U.S. Application Data

(60) Provisional application No. 60/831,427, filed on Jul. 17, 2006.

(51) Int. Cl.
G02C 7/04    (2006.01)
(52) U.S. Cl. .................................. 351/160 R
(58) Field of Classification Search ... 351/160 R–160 H
See application file for complete search history.

(56) References Cited

U.S. PATENT DOCUMENTS

| | | | |
|---|---|---|---|
| 2,129,305 A | 9/1938 | Feinbloom | 88/54 |
| 3,482,906 A | 12/1969 | Volk | 351/160 |
| 3,933,411 A | 1/1976 | Winner | 351/160 |
| 4,095,878 A | 6/1978 | Fanti | 351/161 |
| 4,195,919 A | 4/1980 | Shelton | 351/160 |
| 4,199,231 A | 4/1980 | Evans | 351/160 |
| 4,210,391 A | 7/1980 | Cohen | 351/161 |
| 4,254,065 A | 3/1981 | Ratkowski | 264/2.5 |
| 4,310,225 A | 1/1982 | Davis | 351/176 |
| 4,338,005 A | 7/1982 | Cohen | 351/161 |
| 4,340,283 A | 7/1982 | Cohen | 351/161 |
| 4,407,766 A | 10/1983 | Haardt et al. | 264/2.2 |
| 4,418,991 A | 12/1983 | Breger | 351/161 |
| 4,525,043 A | 6/1985 | Bronstein | 351/160 |
| 4,556,998 A | 12/1985 | Siepser | 623/6 |
| 4,573,775 A | 3/1986 | Bayshore | 351/161 |
| 4,573,998 A | 3/1986 | Mazzocco | 623/6 |
| 4,580,882 A | 4/1986 | Nuchman et al. | 351/161 |
| 4,614,413 A | 9/1986 | Obssuth | 351/161 |
| 4,618,227 A | 10/1986 | Bayshore | 351/161 |
| 4,618,229 A | 10/1986 | Jacobstein et al. | 351/161 |
| 4,636,049 A | 1/1987 | Blaker | 351/161 |
| 4,636,211 A | 1/1987 | Nielsen et al. | 623/6 |
| 4,637,697 A | 1/1987 | Freeman | 351/161 |
| 4,641,934 A | 2/1987 | Freeman | 351/159 |
| 4,642,112 A | 2/1987 | Freeman | 623/6 |
| 4,655,565 A | 4/1987 | Freeman | 351/159 |
| 4,702,573 A | 10/1987 | Morstad | 351/161 |
| 4,752,123 A | 6/1988 | Blaker | 351/161 |
| 4,781,717 A | 11/1988 | Grendahl | 623/6 |
| 4,804,361 A | 2/1989 | Anis | 623/6 |
| 4,813,955 A | 3/1989 | Achatz et al. | 623/6 |
| 4,859,049 A | 8/1989 | Muller | 351/161 |
| 4,869,587 A | 9/1989 | Breger | 351/161 |
| 4,874,234 A | 10/1989 | Wichterle | 351/161 |
| 4,881,804 A | 11/1989 | Cohen | 351/161 |
| 4,881,805 A | 11/1989 | Cohen | 351/161 |
| 4,889,421 A | 12/1989 | Cohen | 351/162 |
| 4,890,913 A | 1/1990 | De Carle | 351/161 |
| 4,898,461 A | 2/1990 | Portney | 351/169 |
| 4,909,818 A | 3/1990 | Jones | 65/31 |
| 4,936,672 A | 6/1990 | Capez | 351/161 |
| 4,971,432 A | 11/1990 | Koeniger | 351/161 |
| 4,976,534 A | 12/1990 | Miege et al. | 351/161 |
| 5,009,497 A | 4/1991 | Cohen | 351/161 |
| 5,016,977 A | 5/1991 | Baude et al. | 350/162 |
| 5,050,981 A | 9/1991 | Roffman | 351/177 |
| 5,066,301 A | 11/1991 | Wiley | 623/6 |
| 5,071,244 A | 12/1991 | Ross | 351/161 |
| 5,076,684 A | 12/1991 | Simpson et al. | 351/168 |
| 5,089,023 A | 2/1992 | Swanson | 623/6 |
| 5,089,024 A | 2/1992 | Christie et al. | 623/6 |
| 5,100,226 A | 3/1992 | Freeman | 351/160 |
| 5,108,169 A | 4/1992 | Mandell | 351/161 |
| 5,114,220 A | 5/1992 | Baude et al. | 351/160 |
| 5,116,111 A | 5/1992 | Simpson et al. | 351/161 |

(Continued)

FOREIGN PATENT DOCUMENTS

CA     1333757     1/1995

(Continued)

OTHER PUBLICATIONS

On and Off-Eye Spherical Aberration of Soft Contact Lenses and Consequent Changes of Effective Lens Power, Holger H. Dietze, et al., Optometry and Vision Science, vol. 80, No. 2, Feb. 2003, pp. 126-134.

(Continued)

*Primary Examiner*—Darryl J Collins
(74) *Attorney, Agent, or Firm*—Jian Zhou; Robert Ambrose

(57) ABSTRACT

The present invention provides a toric contact lens having a controlled optical power profile. In addition, the invention provides a series of toric contact lenses, each having a series of different targeted cylindrical optical powers and a series of different targeted spherical optical powers, and each having a spherical aberration profile in which (1) the optical power deviations of the lens are substantially constant; (2) power deviation at a distance of 3 mm from the optical axis is from about −0.5 diopter to about −1.5 diopters; (3) power deviation at a distance of 3 mm from the optical axis is from about 0.2 diopter to about 1.0 diopter smaller than power deviations at a distance of 2 mm from the optical axis; or (4) there is a spherical aberration component described by any one of fourth order, sixth order, eighth order Zernike spherical aberration-like terms, or combination thereof, wherein the spherical aberration component has a value of −0.5 diopter to about −1.5 diopters at a distance of 3 mm from the optical axis.

27 Claims, No Drawings

U.S. PATENT DOCUMENTS

| | | | |
|---|---|---|---|
| 5,120,120 A | 6/1992 | Cohen | 351/161 |
| 5,125,729 A | 6/1992 | Mercure | 351/161 |
| 5,139,519 A | 8/1992 | Kalb | 623/6 |
| 5,141,301 A | 8/1992 | Morstad | 351/161 |
| 5,172,143 A | 12/1992 | Baude et al. | 351/177 |
| 5,178,636 A | 1/1993 | Silberman | 623/6 |
| 5,192,317 A | 3/1993 | Kalb | 623/6 |
| 5,198,844 A | 3/1993 | Roffman et al. | 351/161 |
| 5,214,453 A | 5/1993 | Giovanzana | 351/161 |
| 5,220,359 A | 6/1993 | Roffman | 351/177 |
| 5,296,881 A | 3/1994 | Freeman | 351/177 |
| 5,341,604 A | 8/1994 | Wood | 51/165.71 |
| 5,404,183 A | 4/1995 | Seidner | 351/161 |
| 5,406,341 A | 4/1995 | Blum et al. | 351/160 |
| 5,408,281 A | 4/1995 | Zhang | 351/161 |
| 5,422,687 A | 6/1995 | Tanaka et al. | 351/161 |
| 5,432,623 A | 7/1995 | Egan et al. | 359/15 |
| 5,443,507 A | 8/1995 | Jacobi | 623/6 |
| 5,493,350 A | 2/1996 | Seidner | 351/161 |
| 5,499,064 A | 3/1996 | Vansaghi | 351/158 |
| 5,517,259 A | 5/1996 | Blum et al. | 351/161 |
| 5,526,071 A | 6/1996 | Seidner et al. | 351/161 |
| 5,528,321 A | 6/1996 | Blum et al. | 351/160 |
| 5,532,768 A | 7/1996 | Onogi et al. | 351/160 |
| 5,557,348 A | 9/1996 | Umeda et al. | 351/169 |
| 5,598,234 A | 1/1997 | Blum et al. | 351/160 |
| 5,608,471 A | 3/1997 | Miller | 351/161 |
| 5,611,970 A | 3/1997 | Apollonio et al. | 264/2.5 |
| 5,619,289 A | 4/1997 | Seidner et al. | 351/161 |
| 5,635,998 A | 6/1997 | Baugh | 351/161 |
| 5,650,837 A | 7/1997 | Roffman et al. | 351/161 |
| 5,652,638 A | 7/1997 | Roffman et al. | 351/161 |
| 5,683,456 A | 11/1997 | Blake | 623/6 |
| 5,691,797 A | 11/1997 | Seider et al. | 351/161 |
| 5,715,031 A | 2/1998 | Roffman et al. | 351/161 |
| 5,724,120 A | 3/1998 | Svochak et al. | 351/161 |
| 5,748,282 A | 5/1998 | Freeman | 351/161 |
| 5,754,270 A | 5/1998 | Rehse et al. | 351/161 |
| 5,764,332 A | 6/1998 | Kranhouse | 351/43 |
| 5,771,088 A | 6/1998 | Perrott | 351/161 |
| 5,793,465 A | 8/1998 | Gupta et al. | 351/161 |
| 5,796,462 A | 8/1998 | Roffman et al. | 351/161 |
| 5,805,260 A | 9/1998 | Roffman et al. | 351/161 |
| 5,805,266 A | 9/1998 | Gupta et al. | 351/177 |
| 5,815,239 A | 9/1998 | Chapman et al. | 351/177 |
| 5,847,802 A | 12/1998 | Menezes et al. | 351/161 |
| 5,861,114 A | 1/1999 | Roffman et al. | 264/2.5 |
| 5,864,379 A | 1/1999 | Dunn | 351/161 |
| 5,872,613 A | 2/1999 | Blum et al. | 351/177 |
| 5,971,542 A | 10/1999 | Volker et al. | 351/161 |
| 5,997,140 A | 12/1999 | Zhang et al. | 351/161 |
| 6,059,775 A | 5/2000 | Nielsen | 606/5 |
| 6,082,856 A | 7/2000 | Dunn et al. | 351/160 H |
| 6,089,711 A | 7/2000 | Blankenbecler et al. | 351/160 |
| 6,106,118 A | 8/2000 | Menezes et al. | 351/169 |
| 6,109,749 A | 8/2000 | Bernstein | 351/161 |
| 6,113,236 A | 9/2000 | Chapman et al. | 351/160 |
| 6,123,422 A | 9/2000 | Menezes et al. | 351/177 |
| 6,139,147 A | 10/2000 | Zhang | 351/161 |
| 6,139,148 A | 10/2000 | Menezes | 351/169 |
| 6,142,625 A | 11/2000 | Sawano et al. | 351/161 |
| 6,149,271 A | 11/2000 | Menezes et al. | 351/169 |
| 6,158,861 A | 12/2000 | Oyanna et al. | 351/160 |
| 6,176,578 B1 | 1/2001 | Chutterbuck et al. | 351/160 |
| 6,176,579 B1 | 1/2001 | Mandell | 351/161 |
| 6,183,082 B1 | 2/2001 | Clutterbuck | 351/160 |
| 6,199,982 B1 | 3/2001 | Oyanna et al. | 351/161 |
| 6,206,520 B1 | 3/2001 | Jubin et al. | 351/160 |
| 6,210,005 B1 | 4/2001 | Portney | 351/161 |
| 6,244,708 B1 | 6/2001 | Chapman et al. | 351/161 |
| 6,244,709 B1 | 6/2001 | Vayntraub et al. | 351/161 |
| 6,260,966 B1 | 7/2001 | Sawano et al. | 351/161 |
| 6,270,218 B1 | 8/2001 | Clutterbuck | 351/160 |
| 6,286,956 B1 | 9/2001 | Oyama | 351/161 |
| 6,364,483 B1 | 4/2002 | Grossinger et al. | 351/161 |
| 6,390,622 B1 | 5/2002 | Muckenhirn et al. | 351/161 |
| 6,390,624 B1 | 5/2002 | Hough | 351/177 |
| 6,406,145 B1 | 6/2002 | Jubin | 351/177 |
| 6,414,214 B1 | 7/2002 | Engelhardt et al. | 604/368 |
| 6,454,409 B1 | 9/2002 | Lorenz et al. | 351/160 |
| 6,457,826 B1 | 10/2002 | Lett | 351/161 |
| 6,467,903 B1 | 10/2002 | Back | 351/160 |
| 6,474,814 B1 | 11/2002 | Griffin | 351/161 |
| 6,491,392 B2 | 12/2002 | Roffman et al. | 351/160 |
| 6,511,178 B1 | 1/2003 | Roffman et al. | 351/161 |
| 6,536,899 B1 | 3/2003 | Fiala | 351/168 |
| 6,568,990 B2 | 5/2003 | Siders et al. | 451/5 |
| 6,595,639 B1 | 7/2003 | Ho et al. | 351/177 |
| 6,746,119 B2 | 6/2004 | Ezekiel | 351/161 |
| 6,923,540 B2 | 8/2005 | Ye et al. | 351/161 |
| 2002/0021410 A1 | 2/2002 | Ye et al. | 351/161 |
| 2002/0024631 A1 | 2/2002 | Roffman et al. | 351/161 |
| 2002/0105617 A1 | 8/2002 | Norrby et al. | 351/177 |
| 2002/0159025 A1 | 10/2002 | Legerton et al. | 351/160 |
| 2002/0186345 A1 | 12/2002 | Duppstadt | 351/161 |
| 2003/0014107 A1 | 1/2003 | Reynard | 623/6.24 |
| 2003/0016331 A1 | 1/2003 | Mandell | 351/161 |
| 2003/0081171 A1 | 5/2003 | Griffin | 351/161 |
| 2003/0090623 A1 | 5/2003 | Rubinstein et al. | 351/177 |

FOREIGN PATENT DOCUMENTS

| | | |
|---|---|---|
| EP | 0 248 489 | 12/1987 |
| EP | 0 109 753 | 7/1988 |
| EP | 0 107 444 | 6/1990 |
| EP | 0 522 852 | 7/1992 |
| EP | 0 566 170 | 10/1993 |
| EP | 0 435 525 | 3/1995 |
| EP | 0 393 639 | 1/1996 |
| EP | 0 745 876 | 12/1996 |
| EP | 0 470 811 | 9/1997 |
| EP | 0 457 553 | 1/1999 |
| EP | 0 980 015 | 2/2000 |
| EP | 0 996 024 | 4/2000 |
| EP | 1 262 815 | 12/2002 |
| FR | 2 582 416 | 5/1985 |
| GB | 1 463 107 | 2/1977 |
| GB | 2 139 375 | 11/1984 |
| JP | 08220487 A | 8/1996 |
| WO | WO 84/04401 | 11/1984 |
| WO | WO 86/03961 | 7/1986 |
| WO | WO 88/09950 | 12/1988 |
| WO | WO 94/12909 | 6/1994 |
| WO | WO 94/23327 | 10/1994 |
| WO | WO 94/23334 | 10/1994 |
| WO | WO 96/08745 | 3/1996 |
| WO | WO 96/10971 | 4/1996 |
| WO | WO 97/10527 | 3/1997 |
| WO | WO 98/45749 | 10/1998 |
| WO | WO 99/23527 | 5/1999 |
| WO | WO 00/48036 | 8/2000 |
| WO | WO 01/44860 | 6/2001 |
| WO | WO 01/51978 | 7/2001 |
| WO | WO 01/75509 | 10/2001 |
| WO | WO 01/92948 | 12/2001 |
| WO | WO 02/08830 | 1/2002 |
| WO | WO 02/14929 | 2/2002 |
| WO | WO 02/083078 | 10/2002 |
| WO | WO 02/084381 | 10/2002 |
| WO | WO 02/088830 | 11/2002 |
| WO | WO 03/032825 | 4/2003 |
| WO | WO 2004/013680 | 2/2004 |
| WO | WO 2004/072709 | 8/2004 |

WO  WO 2005/015289  2/2005

OTHER PUBLICATIONS

Chateau, Blanchard and Baude "Influence of Myopia and Aging on the Optimal Spherical Aberration of Soft Contract Lenses" vol. 15, No. 9/Sep. 1998, J. Opt. Soc. Am. A., pp. 2589-2596.

Artal, Ferro, Miranda, and Navarro "Effects of Aging in Retinal Image Quality", J. Opt. Soc. Am. A./vol. 10, No. 7/Jul. 1993, pp. 1656-1662.

Anstice "Astigmatism—Its Components And Their Changes With Age", 1971, American Journal of Optometry and Archives of American Academy of Optometry, pp. 1001-1006.

Jenkins "Aberrations Of The Eye And Their Effects On Vision: Part 1", National Library of Medicine, pp. 59-91.

TORIC CONTACT LENSES WITH CONTROLLED OPTICAL POWER PROFILE

This application claims the benefits under 35 USC 119(e) of the U.S. Provisional Patent Application No. 60/831,427 filed Jul. 17, 2006 herein incorporated by reference in its entirety.

This invention is related to contact lenses. In particular, the present invention is related to toric contact lenses having a cylindrical optical surface (or power) to correct astigmatism vision errors and a controlled optical power profile that provides improved vision correction.

BACKGROUND

Contact lenses are widely used for correcting many different types of vision deficiencies. These include defects such as near-sightedness and far-sightedness (myopia and hypermetropia, respectively), astigmatism vision errors, and defects in near range vision usually associated with aging (presbyopia).

Astigmatism is optical power meridian-dependent refractive error in an eye. This is usually due to one or more refractive surfaces, most commonly the anterior cornea, having a toroidal shape. It may also be due to one or more surfaces being transversely displaced or tilted. Astigmatism is usually regular, which means that the principal (maximum and minimum power) meridians are perpendicular to each other. People with astigmatism have blurred vision at all distances, although this may be worse at distance or near, depending on the type of astigmatism. These people may complain of sore eyes and headaches associated with demanding visual tasks. Astigmatism can be corrected with a toric contact lens, which usually has one spherical surface and one toroidal (cylindrical) surface which can be formed in either the posterior surface (back surface) or in the anterior surface (front surface) of the toric lens. Since astigmatism requiring vision correction is usually associated with other refractive abnormalities, such as myopia (nearsightedness) or hypermetropia (farsightedness), toric contact lenses are generally prescribed also with a spherical power correction to correct myopic astigmatism or hypermetropic astigmatism.

A conventional toric contact lens with one toroidal surface and one spherical surface typically will have an uncontrolled optical power profile. The optical power at any given position of the toric lens depends not only upon the distance from the optical axis (or lens center) but also upon angular position relative to the principal meridians of the toric lens. In addition, the optical power profile of a toric lens is dependent upon its targeted optical powers (i.e, Rx). The optical power of a toric lens can be composed of purely positive power deviations (i.e., the power at a position depart from the lens center being larger than the power at the lens center), purely negative power deviations (i.e., the power at a position depart from the lens center being less than the power at the lens center), or the combination of both, depending on the spherical optical power and the cylindrical optical power of the lens. With such uncontrolled optical power profile, a toric lens may not provide optimal vision to a patient, especially with a larger pupils.

Moreover, the spherical aberration can be an inherent high order aberration component of an eye. The spherical aberration generally is a rotationally symmetric aberration around the optical axis. A typical adult human eye, as a result of the optical characteristics of the cornea and crystal lens, inherently exhibits an increasing amount of spherical aberration (positive spherical aberration) as the diameter of the pupil expands. Typically, the spherical aberration, of an adult, is about one diopter at a 6 mm diameter pupil, while the spherical aberration is slightly less than two diopters at an 8 mm pupil. A toric lens with purely positive power deviation may not compensate but instead accentuate the inherent spherical aberration of an eye and as such, may not be able to provide a good vision to a patient with a relative large pupil or under a dark illumination condition (i.e., with a dilated pupil).

Therefore, it is advantageous that a toric lens is designed to have a controlled optical power profile, which is preferably capable of compensating the inherent spherical aberration of a typical human eye, so as to provide an improved vision to a patient.

An object of the invention is to provide a toric contact lens having a controlled optical power profile.

Another object of the invention is to provide a method for producing a toric contact lens having a controlled optical power profile.

A further object of the invention is to provide a family of contact lenses having a series of different cylindrical powers and a series of different spherical powers. Each lens in the series has a controlled optical power profile.

SUMMARY OF THE INVENTION

In accomplishing the foregoing, there is provided, in accordance with one aspect of the present invention, a toric contact lens having a controlled power profile. A toric contact lens of the invention has an optical axis, an anterior surface having a first optical zone, and an opposite posterior surface having a second optical zone. The first optical zone and the second optical zone combine to provide a targeted cylindrical optical power and a targeted spherical optical power. At least one of the first and second optical zone has an aspherical surface which is designed to provide, in combination with the surface of the other optical zone, a controlled optical power profile which is substantially rotationally-symmetric with respect to the optical axis or incorporated a spherical aberration component, wherein the spherical aberration component is described by any one of fourth order, sixth order, eighth order Zernike spherical aberration-like terms and has a value of −0.5 diopter to about −1.5 diopters at a distance of 3 mm from the optical axis.

The invention, in another aspect, provides a family of toric contact lenses having a series of different targeted cylindrical optical powers and a series of different targeted spherical optical powers, wherein each contact lens in the series has an optical axis, an anterior surface having a first optical zone, and an opposite posterior surface having a second optical zone, wherein one of the first and second optical zones is a toroidal surface whereas the other optical zone is a non-toroidal spherical or aspherical surface, wherein the surface of at least one of the first and second optical zone is designed to provide, in combination with the surface of the other optical zone, provide a controlled optical power profile in which (1) the optical power deviations of the lens are substantially constant; (2) power deviation at a distance of 3 mm from the optical axis are from about −0.5 diopter to about −1.5 diopters; (3) power deviation at a distance of 3 mm from the optical axis is from about 0.2 diopter to about 1.0 diopter smaller than power deviations at a distance of 2 min from the optical axis; or (4) there is a spherical aberration component described by any one of fourth order, sixth order, eighth order Zernike spherical aberration-like terms, or combination thereof, wherein the spherical aberration component has a value of −0.5 diopter to about −1.5 diopters at a distance of 3 mm from the optical axis.

The invention, in other aspects, provides a method for producing a toric contact lens of the invention or a series of toric contact lenses of the invention.

These and other aspects of the invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

As used herein, an "aspheric surface" is intended to describe a non-spherical surface.

A "spherical contact lens" is intended to describe a contact lens having an optical zone the two opposite surfaces of which are spherical (i.e., each can be defined by a spherical mathematical function).

The optical axis is an imaginary line passing through both the centers of the two opposite surfaces of the optical zone of a contact lens.

The line of sight (LOS), as known to a person skilled in the art is an imaginary line that connects the fixation point to the center of the entrance pupil and the center of the exit pupil to the fovea. LOS has been recommended by a task force sponsored by the Optical Society of American to be used as the reference axis for the measurement and reporting of the optical aberration of the eye (Applegate, et al., in Vision Science and Its Applications, OSA Technical Digest (Optical Society of America, Washington D.C.), 2000:146-149, herein incorporated by reference in its entirety). Usually, LOS is denoted by angle κ measured from pupillary axis. The pupillary axis is an axis strikes the corner at right angles and passes through the center of the entrance pupil.

A "targeted spherical optical power" in reference to a contact lens means an optical power prescribed by an eye-care practitioner to provide a negative or positive spherical power correction. Traditionally, the targeted spherical optical power corresponds to the optical power at the center of the optical zone of a contact lens.

A "targeted cylindrical optical power" in reference to a contact lens means an optical power prescribed by an eye-care practitioner to correct astigmatism vision errors of a patient.

As used herein, "spherical aberration" in reference to a lens means that the optical power of the lens varies with the distance from the optical axis (radius or diameter), deviates from the ideal optical power (i.e., at the center of the optical zone). Negative spherical aberration is intended to describe that the optical power of a lens at a position deviate from the center of its optical zone is smaller (or more negative) than the optical power of the lens at the center of the optical zone. Positive spherical aberration is intended to describe that the optical power of a lens at a position deviate from the center of its optical zone is larger (or more positive) than the optical power of the lens at the center.

A "spherical aberration component" in reference to a toric contact lens is intended to describe that a component of the wavefront aberration of a toric lens can be defined by a spherical aberration-like Zernike term in Zernike polynomials.

Zernike polynomials are a set of functions that are orthogonal over the unit circle. They are useful for describing the shape of an aberrated wavefront. There exists several different normalization and numbering schemes for these polynomials. The Zernike polynomials are usually defined in polar coordinates $(\rho,\theta)$, where $\rho$ is the radial coordinate ranging from 0 to 1 and $\theta$ is the azimuthal component ranging from 0 to $2\pi$. Each of the Zernike polynomials consists of three components: a normalization factor, a radial dependent component and an azimuthal dependent component. The radial component is a polynomial, whereas the azimuthal component is sinusoidal. A double indexing scheme is useful for unambiguously describing the functions, with the index n describing the highest power or order of the radial polynomial and the index m describing the azimuthal frequency of the azimuthal component.

Since Zernike polynomials are orthogonal, the aberrations are separable and can be treated as follows. The first order Zernike modes are the linear terms. The second order Zernike modes are the quadratic terms, correspond to power and astigmatism. The third order Zernike modes are the cubic terms, which correspond to the coma and trefoil. The fourth order Zernike modes include spherical aberration, secondary astigmatism and quadrafoil. The fifth Zernike modes are the higher-order, irregular aberrations. Local irregularities in the wavefront within the pupil are represented by these higher-order Zernike.

A table of the proposed OSA Standard (Optical Society of America) Zernike Polynomials up to $6^{th}$ order is displayed below (More information on Zernike polynomials is available on http://color.eri.harvard.edu/standardization/standards_TOPS4.pdf).

| j | n | m | $Z_n^m(\rho,\theta)$ |
|---|---|---|---|
| 0 | 0 | 0 | 1 |
| 1 | 1 | −1 | $2\rho\sin\theta$ |
| 2 | 1 | 1 | $2\rho\cos\theta$ |
| 3 | 2 | −2 | $\sqrt{6}\,\rho^2\sin 2\theta$ |
| 4 | 2 | 0 | $\sqrt{3}\,(2\rho^2-1)$ |
| 5 | 2 | 2 | $\sqrt{6}\,\rho^2\cos 2\theta$ |
| 6 | 3 | −3 | $\sqrt{8}\,\rho^3\sin 3\theta$ |
| 7 | 3 | −1 | $\sqrt{8}\,(3\rho^3-2\rho)\sin\theta$ |

-continued

| j | n | m | $Z_n^m(\rho, \theta)$ |
|---|---|---|---|
| 8 | 3 | 1 | $\sqrt{8}\,(3\rho^3 - 2\rho)\cos\theta$ |
| 9 | 3 | 3 | $\sqrt{8}\,\rho^3 \cos 3\theta$ |
| 10 | 4 | -4 | $\sqrt{10}\,\rho^4 \sin 4\theta$ |
| 11 | 4 | -2 | $\sqrt{10}\,(4\rho^4 - 3\rho^2)\sin 2\theta$ |
| 12 | 4 | 0 | $\sqrt{5}\,(6\rho^4 - 6\rho^2 + 1)$ |
| 13 | 4 | 2 | $\sqrt{10}\,(4\rho^4 - 3\rho^2)\cos 2\theta$ |
| 14 | 4 | 4 | $\sqrt{10}\,\rho^4 \cos 4\theta$ |
| 15 | 5 | -5 | $\sqrt{12}\,\rho^5 \sin 5\theta$ |
| 16 | 5 | -3 | $\sqrt{12}\,(5\rho^5 - 4\rho^3)\sin 3\theta$ |
| 17 | 5 | -1 | $\sqrt{12}\,(10\rho^5 - 12\rho^3 + 3\rho)\sin\theta$ |
| 18 | 5 | 1 | $\sqrt{12}\,(10\rho^5 - 12\rho^3 + 3\rho)\cos\theta$ |
| 19 | 5 | 3 | $\sqrt{12}\,(5\rho^5 - 4\rho^3)\cos 3\theta$ |
| 20 | 5 | 5 | $\sqrt{12}\,\rho^5 \cos 5\theta$ |
| 21 | 6 | -6 | $\sqrt{14}\,\rho^6 \sin 6\theta$ |
| 22 | 6 | -4 | $\sqrt{14}\,(6\rho^6 - 5\rho^4)\sin 4\theta$ |
| 23 | 6 | -2 | $\sqrt{14}\,(15\rho^6 - 20\rho^4 + 6\rho^2)\sin 2\theta$ |
| 24 | 6 | 0 | $\sqrt{7}\,(20\rho^6 - 30\rho^4 + 12\rho^2 - 1)$ |
| 25 | 6 | 2 | $\sqrt{14}\,(15\rho^6 - 20\rho^4 + 6\rho^2)\cos 2\theta$ |
| 26 | 6 | 4 | $\sqrt{14}\,(6\rho^6 - 5\rho^4)\cos 4\theta$ |
| 27 | 6 | 6 | $\sqrt{14}\,\rho^6 \cos 6\theta$ |

A "spherical aberration-like term" refers to any one of $Z_4^0$, $Z_6^0$, $Z_8^0$, $Z_{10}^0$ in the proposed OSA Standard (Optical Society of America) Zernike Polynomials or a combination of these Zernike terms.

Isolation of the spherical aberration component can be accomplished by measuring lenses, across the power range, on a lensometer system capable of decomposing the wavefront into a Zernike basis set. Examples of these devices are the Shack-Hartmann based system from Wavefront Sciences and the Lateral Shearing interferometric based system from Rotlex. These system can output the power profile of wavefront in a manner similar to an Ophthalmic wavefront sensor. A phoropter used to measure the subjective refraction of an eye averages the axi-symmetric terms, but can isolate the astigmatic component via the use of cylinderical lenses. Likewise, lensometers such as the Marco average the axi-symmetical terms of a wavefront, but can isolate the toric component.

A "power deviation" refers to a difference in powers between at a given lens position $(\rho,\theta)$ and at the optical center $(0,0)$ where the optical axis of the lens pass through, i.e., $\Delta p = p_x - p_o$, where $\Delta p$ is power deviation at a lens position $(\rho,\theta)$ relative to the optical center, $p_{\rho,\theta}$ is the optical at the lens position $(\rho,\theta)$, $p_{0,0}$ is the optical power at the optical center.

A "substantially constant power profile" in reference to a contact lens is intended to describe a power profile in which optical power deviations at any positions (deviated from the center of the optical zone) within a 6 mm-diameter optical zone is between about −0.1 diopter to about 0.1 diopter.

"An optical model lens" refers to an ophthalmic lens that is designed in a computer system and generally does not contain other non-optical systems which are parts of a contact lens.

"A bevel" refers to a non-optical surface zone located at the edge of the posterior surface of a contact lens. Generally, the bevel is a significantly flatter curve and is usually blended with the base curve (optical posterior surface) of a contact lens and appears as an upward taper near the edge. This keeps the steeper base curve radius from gripping the eye and allows the edge to lift slightly. This edge lift is important for the proper flow of tears across the cornea and makes the lens fit more comfortable.

"A lenticular" refers to a non-optical surface zone of the anterior surface of a contact lens between the optical zone and the edge. The primary function of the lenticular is to control the thickness of the lens edge.

In one aspect, the invention provides a toric contact lens having a controlled optical power profile. A toric contact lens of the invention has an optical axis, an anterior surface having a first optical zone, and an opposite posterior surface having a second optical zone. The first optical zone and the second optical zone combine to provide a targeted cylindrical optical power and a targeted spherical optical power. At least one of the first and second optical zone has an aspherical surface which is designed to provide, in combination with the surface of the other optical zone, a controlled optical power profile which is substantially rotationally-symmetric with respect to the optical axis or incorporated a spherical aberration component, wherein the spherical aberration component is described by any one of fourth order, sixth order, eighth order Zernike spherical aberration-like terms and has a value of −0.5 diopter to about −1.5 diopters at a distance of 3 mm from the optical axis. In accordance with the invention, the term "substantially rotationally-symmetric" in reference to a toric contact lens is intended to describe that optical powers at a given radius from the optical axis within the optical zone of the lens are substantial constant, i.e., the maximum difference in optical power is less than about 0.05 diopters measured at 3 mm from the optical axis.

In accordance with the invention, one of the first optical zone or the second optical zone is a toroidal surface and the other zone is a spherical surface or preferably an aspheric surface.

The toroidal surface is formed by defining a curve in the Y-Z plane, wherein the Z-axis passes through the apex of the curve in normal direction, and then rotating this curve around an axis parallel to the Y-axis from a distance r. The value of the distance r is selected based on a desired cylindrical optical power of a contact lens for correcting a wearer's astigmatism. The curve can be defined by any mathematic function, preferably by a conic function (Eq. 1) or a polynomial function (Eq. 2)

$$z = \frac{cy^2}{1 + \sqrt{1 - (1+k)c^2 y^2}} \qquad (1)$$

$$z = \frac{cy^2}{1 + \sqrt{1 - (1+k)c^2 y^2}} + \alpha_1 y^2 + \\ \alpha_2 y^4 + \alpha_3 y^6 + \alpha_4 y^8 + \alpha_5 y^{10} + \alpha_6 y^{12} + \alpha_7 y^{14} \qquad (2)$$

in which c is the curvature (the reciprocal of the radius), k is a conic constant and $\alpha_1$ to $\alpha_7$ are the coefficients. The value of the distance r can be selected to impart a desired cylindrical optical power to the contact lens for correcting astigmatism errors of an eye.

The toroidal surface can also be a biconic surface defined by Eq. 3:

$$z = \frac{c_x x^2 + c_y y^2}{1 + \sqrt{1 - (1+k_x)c_x^2 x^2 - (1+k_y)c_y^2 y^2}} \qquad (3)$$

where $c_x$ and $c_y$ are the curvatures at x and y meridians, $k_x$ and $k_y$ are conic constants, and Z-axis passes through the apex of the surface.

In accordance with the invention, the non-toroidal aspheric surface is preferably defined by rotating a curve of Eq. 1 or 2 around Z-axis.

In accordance with the invention, the optical axis of a contact lens can be the central axis which passes through the geometrical centers of the anterior and posterior surfaces.

In a preferred embodiment, the optical axis coincides substantially with the line-of-sight (LOS) of an eye. It is believed that with higher levels of aberrations, it becomes more critical to align the refractive correction over the eye's line of sight, not the center of the lens.

In accordance with the invention, the line of sight of an eye can be measurement data of an eye of an individual or preferably characteristic data representing statistically the line of sight of eyes of individuals from a population.

Any suitable method can be used to obtain the line of sight of an eye. For example, one can obtain the LOS of an eye through wavefront data and corneal topography of the eye fixated in primary gaze.

Due to the decentration of the fovea (typically temporal and inferior) and the eye's aberrations, the line of sight of the eye is not typically aligned to the geometric or mechanical axis of the eye. In such case, the contact lens will not provide optimal visual adjustment to the images conveyed to the eye of the wearer.

In a preferred embodiment, lens power deviation at a distance of 3 mm from the optical axis are from about −0.5 diopters to about −1.5 diopters, preferably from about −0.8 diopters to about −1.1 diopters. Lens power deviation at a position is intended to describe the difference in power between at the point where the optical axis passes through and at that position ($P_o-P_i$).

In another preferred embodiment, the controlled optical power profile of the lens comprises a spherical aberration component which is described by any one of $Z_4^0$, $Z_6^0$, $Z_8^0$, $Z_{10}^0$ in the proposed OSA Standard (Optical Society of America) Zernike Polynomials or a combination of these Zernike terms, wherein the spherical aberration component has a value of −0.5 diopter to about −1.5 diopters, preferably from about −0.8 diopters to about −1.1 diopters, at a distance of 3 mm from the optical axis. Preferably, the spherical aberration component is described by $Z_4^0$. When just calculating the value of Z(4,0) term in RMS is from about −0.034 μm (corresponding to a spherical aberration value of −0.2 D) to about −0.168 μm (corresponding to a spherical aberration value of −1.0 D).

In another preferred embodiment, a toric contact lens of the invention is a toric multifocal contact lens. One of the first and second optical zones is a toroidal surface, the other optical zone comprises a central circular area having a diameter of from about 2.0 mm to about 3.50 mm and an annular region surrounding the central circular area. The central circular area and the annular region are concentric with the optical axis. The first and second optical zones combine together to provide a targeted cylindrical optical power to correct astigmatism vision errors and a multifocal spherical optical power to compensate for presbyopia.

The annular region surrounding the central circular area has a surface to provide a substantially constant power (base power or targeted power) from the inner peripheral edge to the outer peripheral edge for distance vision correction. The surface can be spherical or aspherical.

The central circular area is a progressive power addition zone for near vision correction and optionally for intermediate vision correction. It is substantially concentric with the optical axis. The progressive power addition zone preferably has a diameter of about 2.0 to about 3.5, more preferably about 2.2 mm to 3.0 mm.

Preferably, the first optical zone of the anterior surface is the toroidal surface or the biconic surface and the posterior surface comprises the progressive power addition zone.

The optical zone which is a toroidal or biconic surface can have a shape of any conventional toric lens. Preferably, it is circular. More preferably, it is substantially concentric with the optical axis.

It is understood that each lens in the series of contact lenses can have one or more non-optical zones which surround the optical zone. A person skill in the art will know well how to incorporate a family of common non-optical zones into a lens design.

A toric contact lens of the invention can further comprise one or more orientation features that provide a predetermined orientation on the eye. Exemplary orientation features include, but are not limited to, two thin zones, contour double slab-off, prism ballast carrier, and the like. Preferably, a toric contact lens of the invention has an orientation feature disclosed in U.S. Pat. No. 7,052,133.

The invention, in another aspect, provides a family of toric contact lenses having a series of different targeted cylindrical optical powers and a series of different targeted spherical optical powers, wherein each contact lens in the series has an optical axis, an anterior surface having a first optical zone, and an opposite posterior surface having a second optical zone, wherein one of the first and second optical zones is a toroidal surface whereas the other optical zone is a non-toroidal spherical or aspherical surface, wherein the surface of at least one of the first and second optical zone is designed to provide, in combination with the surface of the other optical zone, provide a controlled optical power profile in which (1) the optical power deviations of the lens are substantially constant; (2) power deviation at a distance of 3 mm from the optical axis are from about −0.5 diopter to about −1.5 diopters; (3) power deviation at a distance of 3 mm from the optical axis is from about 0.2 diopter to about 1.0 diopter smaller than power deviations at a distance of 2 mm from the optical axis; or (4) there is a spherical aberration component described by any one of fourth order, sixth order, eighth order Zernike spherical aberration-like terms, or combination thereof, wherein the spherical aberration component has a value of −0.5 diopter to about −1.5 diopters at a distance of 3 mm from the optical axis.

In accordance with the invention, a series of lenses refers to a family of lenses each having a targeted spherical optical power of from about −15 to about 10 diopters (D), preferably from about −10 diopters to 6 diopters and a targeted cylindrical optical power, e.g., magnitudes from about 0.75 diopters to about 4.0 diopters.

Various embodiments of toroidal surface, non-toroidal surface, orientation features, and optical axis described can be used incorporated in this aspect of the invention.

In a preferred embodiment, each lens in the series is substantially free of optical power deviations.

In another preferred embodiment, the optical power deviation profile of each lens in the series are substantially rotationally-symmetric. More preferably, each lens having a targeted spherical optical power of from 0 to about 15 diopters is substantially free of power deviation; each lens having a targeted spherical optical power of from about −1.0 diopter to about −6.0 diopters has a power deviation profile mimicking that of a spherical lens with identical targeted spherical optical power; and each lens having a targeted spherical optical power of from about −6.0 diopter to about −15.0 diopters has a controlled optical power profile in which power deviation at a distance of 3 mm from the optical axis is from about 0.2 diopters to about 1.0 diopter less than the power deviation at a distance of 2 mm from the optical axis.

In another preferred embodiment, all lenses in the series have a substantially identical spherical aberration component which has a spherical aberration value of −0.5 diopter to about −1.5 diopters, preferably from about −0.8 diopters to about −1.1 diopters, at a distance of 3 mm from the optical axis.

In another preferred embodiment, all lenses in the series have a substantially identical spherical aberration component in which spherical aberration value at a distance of 3 mm from the optical axis is from about 0.2 diopters to about 1.0 diopter smaller than that at a distance of 2 mm from the optical axis.

In another preferred embodiment, the non-toroidal surface comprises a central circular area having a diameter of from about 1.0 mm to about 4.0 mm and an annular region surrounding the central circular area. The central circular area and the annular region are concentric with the optical axis. The non-toroidal surface and the toroidal surface combine together to provide a targeted cylindrical optical power to correct astigmatism vision errors and a multifocal spherical power to compensate for presbyopia.

The annular region surrounding the central circular area has a surface to provide a substantially constant power (base power or targeted power) from the inner peripheral edge to the outer peripheral edge for distance vision correction. The surface can be spherical or aspherical.

The central circular area is a progressive power addition zone for near vision correction and optionally for intermediate vision correction. It is substantially concentric with the optical axis. The progressive power addition zone preferably has a diameter of about 2.0 to about 3.5, more preferably about 2.2 mm to 3.0 mm.

The above-described various embodiments of the progressive power addition zone can be incorporated in this preferred embodiment.

It is understood that each lens in the series of contact lenses can have one or more non-optical zones which surround the optical zone. A person skill in the art will know well how to incorporate a family of common non-optical zones into a lens design.

By using an optical computer aided design (CAD) system and a mechanical CAD system, one can design a toric contact lens of the invention. An optical CAD system is used to design an optical model lens. Any known, suitable optical computer aided design (CAD) system may be used to design an optical model lens. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

The design of the optical model lens can be transformed by, for example, a mechanical CAD system, into a mechanical lens design that includes optical zones, non-optical zones and non-optical features. Exemplary non-optical zones and features of a contact lens include, but are not limited to bevel, lenticular, edge that joins the anterior and posterior surfaces of a contact lens, orientation features, and the like. Exemplary orientation features include, but are not limited to, a prism ballast or the like that uses a varying thickness profile to control the lens orientation, a faceted surface (e.g., ridge-off zone) in which parts of the lens geometry is removed to control the lens orientation, a ridge feature which orients the lens by interacting with the eyelid. Preferably, when transforming the design of an optimized optical model lens into a mechanical lens design, some common features of a family of contact lenses can be incorporated.

Any know, suitable mechanical CAD system can be used in the invention. Preferably, a mechanical CAD system capable of representing precisely and mathematically high order surfaces is used to design a contact lens. An example of such mechanical CAD system is Pro/Engineer.

Preferably, the design of a contact lens may be translated back and forth between the optical CAD and mechanical CAD systems using a translation format which allows a receiving system, either optical CAD or mechanical CAD, to construct NURBs or Beizier surfaces of an intended design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radially asymmetrical shapes. Beizier and NURBs surface are particular advantageous for presbyopic design because multiple zones can be blended, analyzed and optimized.

Any mathematical function can be used to describe the anterior surface, posterior surface, peripheral edge of an ophthalmic lens, as long as they have sufficient dynamic range which allow the design of that lens to be optimized. Exemplary mathematical functions include conic and quadric functions, polynomials of any degree, Zernike polynomials, exponential functions, trigonometric functions, hyperbolic functions, rational functions, Fourier series, and wavelets. Preferably, a combination of two or more mathematical functions are used to describe the front (anterior) surface and base (posterior) surface of an ophthalmic lens. More preferably, Zernike polynomials are used to describe the front (anterior) surface and base (posterior) surface of an ophthalmic lens. Even more preferably, Zernike polynomials and spline-based mathematical functions are used together to describe the front (anterior) surface and base (posterior) surface of an ophthalmic lens.

Toric contact lenses of the invention can be either hard or soft lenses. Soft contact lenses of the invention is preferably made from a soft contact lens material, such as hydrogels. Any known suitable hydrogels can be used in the invention. Preferably, a silicone-containing hydrogel is used in the invention. It will be understood that any lens described above comprising any soft contact lens material would fall within the scope of the invention.

After completing a desired design, a toric contact lens can be produced in a computer-controlled manufacturing system. The lens design can be converted into a data file containing control signals that is interpretably by a computer-controlled manufacturing device. A computer-controlled manufacturing device is a device that can be controlled by a computer system and that is capable of producing directly an ophthalmic lens or an optical tools for producing an ophthalmic lens. Any known, suitable computer controllable manufacturing device can be used in the invention. Preferably, a computer controllable manufacturing device is a numerically controlled lathe, preferably a two-axis lathe with a 45° piezo cutter or a lathe apparatus disclosed by Durazo and Morgan in U.S. Pat. No. 6,122,999, herein incorporated by reference in its entirety, more preferably a numerically controlled lathe from Precitech, Inc., for example, such as Optoform ultra-precision lathes (models 30, 40, 50 and 80) having Variform piezoceramic fast tool servo attachment.

Preferred methods for designing and manufacturing toric contact lenses of the invention are those described in co-pending U.S. Patent Application Publication No. US 2006/0055876 A1, herein incorporated by reference in its entirety.

Toric contact lenses of the invention can now be manufactured each of which has a targeted cylindrical optical power to correct astigmatism vision errors and a targeted spherical optical power to compensate for myopia, hypermetropia, or presbyopia. Toric contact lenses of the invention may be produced by any convenient means, for example, such as lathing and molding. Preferably, toric contact lenses are molded from contact lens molds including molding surfaces that replicate the contact lens surfaces when a lens is cast in the molds. For example, an optical cutting tool with a numerically controlled lathe may be used to form metallic optical tools. The tools are then used to make convex and concave surface molds that are then used, in conjunction with each other, to form the lens of the invention using a suitable liquid lens-forming material placed between the molds followed by compression and curing of the lens-forming material.

Accordingly, contact lenses according to the invention can be manufactured by imparting contact lens molds two molding surfaces, a first molding surface and a second molding surface. The molds having the first molding surface or the second molding surface, in conjunction with each other, form a toric contact lens of the invention.

In a further aspect, the present invention provides a method for producing a toric contact lens having a controlled optical profile. The method comprises the steps of shaping a contact lens by a manufacturing means to have an optical axis, an anterior surface having a first optical zone, and an opposite posterior surface having a second optical zone, wherein the first optical zone and the second optical zone combine to provide a targeted cylindrical optical power and a targeted spherical optical power, wherein at least one of the first and second optical zone has an aspherical surface which is designed to provide, in combination with the surface of the other optical zone, a controlled optical power profile which is substantially rotationally-symmetric with respect to the optical axis or incorporated a spherical aberration component, wherein the spherical aberration component is described by any one of fourth order, sixth order, eighth order Zernike spherical aberration-like terms and has a value of −0.5 diopter to about −1.5 diopters at a distance of 3 mm from the optical axis.

In still a further aspect, the present invention provides a method for producing a series of toric contact lenses having a series of different targeted cylindrical optical powers and a series of different targeted spherical optical powers. The method comprises the steps of shaping each toric contact lens by a manufacturing means to have an optical axis, an anterior surface having a first optical zone, and an opposite posterior surface having a second optical zone, an optical axis, an anterior surface having a first optical zone, and an opposite posterior surface having a second optical zone, wherein one of the first and second optical zones is a toroidal surface whereas the other optical zone is a non-toroidal spherical or aspherical surface, wherein the surface of at least one of the first and second optical zone is designed to provide, in combination with the surface of the other optical zone, provide a controlled optical power profile in which (1) the optical power deviations of the lens are substantially constant; (2) power deviation at a distance of 3 mm from the optical axis are from about −0.5 diopter to about −1.5 diopters; (3) power deviation at a distance of 3 mm from the optical axis is from about 0.2 diopter to about 1.0 diopter smaller than power deviations at a distance of 2 mm from the optical axis; or (4) there is a spherical aberration component described by any one of fourth order, sixth order, eighth order Zernike spherical aberration-like terms, or combination thereof, wherein the spherical aberration component has a value of −0.5 diopter to about −1.5 diopters at a distance of 3 mm from the optical axis.

Preferably, a toric contact lens of the invention is fabricated by using a numerically controlled lathe, for example, such as Optoform ultra-precision lathes (models 30, 40, 50 and 80) having Variform piezo-ceramic fast tool servo attachment from Precitech, Inc.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A toric contact lens, comprising an optical axis, an anterior surface having a first optical zone, and an opposite posterior surface having a second optical zone, wherein one of the first optical zone or the second optical zone is a toroidal surface whereas the other zone is non-toroidal surface which is a spherical surface or an aspheric surface, wherein the toroidal and non-toroidal surfaces combine to provide a targeted cylindrical optical power and a targeted spherical optical power, wherein at least one of the first and second optical zone has an aspherical surface which is designed to provide, in combination with the surface of the other optical zone, a controlled optical power profile which is substantially rotationally-symmetric with respect to the optical axis or incorporates a spherical aberration component, wherein the spherical aberration component is described by any one of fourth order, sixth order, eighth order Zernike spherical aberration-like terms and has a spherical aberration value of from about −0.5 diopter to about −1.5 diopters at a distance of 3 mm from the optical axis.

2. The toric contact lens of claim 1, wherein the controlled optical power profile is substantially rotationally-symmetric with respect to the optical axis.

3. The toric contact lens of claim 1, wherein the controlled optical power profile incorporates a spherical aberration component, wherein the spherical aberration component is described by any one of fourth order, sixth order, eighth order Zernike spherical aberration-like terms and has a spherical aberration value of from about −0.5 diopters to about −1.5 diopters.

4. The toric contact lens of claim 1, wherein the lens has an optical power deviation of from about −0.8 diopters to about −1.1 diopters at a distance of 3 mm from the optical axis.

5. The toric contact lens of claim 1, wherein the toroidal surface is formed by defining a curve in the Y-Z plane and then rotating this curve around an axis parallel to the Y-axis from a distance r, wherein the Z-axis passes through the apex of the curve in normal direction, wherein the value of the distance r is selected based on the targeted cylindrical optical power, wherein the curve is defined by any mathematic function to provide the targeted spherical optical power.

6. The toric contact lens of claim 5, wherein the curve is defined by Equation 1 or 2

$$z = \frac{cy^2}{1+\sqrt{1-(1+k)c^2y^2}} \quad (1)$$

$$z = \frac{cy^2}{1+\sqrt{1-(1+k)c^2y^2}} + \alpha_1 y^2 + \\ \alpha_2 y^4 + \alpha_3 y^6 + \alpha_4 y^8 + \alpha_5 y^{10} + \alpha_6 y^{12} + \alpha_7 y^{14} \quad (2)$$

in which c is the curvature (the reciprocal of the radius), k is a conic constant and $\alpha_1$ to $\alpha_7$ are the coefficients. The value of the distance r can be selected to impart a desired cylindrical optical power to the contact lens for correcting astigmatism errors of an eye.

7. The toric contact lens of claim 1, wherein the toroidal surface is defined by Equation 3

$$z = \frac{c_x x^2 + c_y y^2}{1+\sqrt{1-(1+k_x)c_x^2 x^2 - (1+k_y)c_y^2 y^2}} \quad (3)$$

where $c_x$ and $c_y$ are the curvatures at x and y meridians, $k_x$ and $k_y$ are conic constants, and Z-axis passes through the apex of the surface.

8. The toric contact lens of claim 1, wherein the optical axis of a contact lens coincides with the central axis which passes through the geometrical centers of the anterior and posterior surfaces.

9. The toric contact lens of claim 1, wherein the optical axis coincides substantially with the line-of-sight (LOS) of an eye.

10. The toric contact lens of claim 1, wherein the non-toroidal surface comprises a central circular area having a diameter of from about 2.0 mm to about 3.5 mm and an annular region surrounding the central circular area, wherein the central circular area and the annular region are concentric with the optical axis, wherein the toroidal and non-toroidal surface combine together to provide a targeted cylindrical optical power to correct astigmatism vision errors and a multifocal spherical optical power to compensate for presbyopia.

11. The toric contact lens of claim 10, wherein the central circular area is a progressive power addition zone for near vision correction and optionally for intermediate vision correction, wherein the annular region surrounding the central circular area is a distance vision zone.

12. A series of toric contact lenses, each having a targeted spherical optical power of from about −15 diopters to about 10 diopters and a targeted cylindrical optical power, wherein each contact lens in the series has an optical axis, an anterior surface having a first optical zone, and an opposite posterior surface having a second optical zone, wherein one of the first and second optical zones is a toroidal surface whereas the other optical zone is a non-toroidal spherical or aspherical surface, wherein the surface of at least one of the first and second optical zone is designed to provide, in combination with the surface of the other optical zone, provide a controlled optical power profile in which (1) the optical power deviations of the lens are substantially constant; (2) power deviation at a distance of 3 mm from the optical axis is from about −0.5 diopter to about −1.5 diopters; (3) power deviation at a distance of 3 mm from the optical axis is from about 0.2 diopter to about 1.0 diopter smaller than power deviations at a distance of 2 mm from the optical axis; or (4) there is a spherical aberration component described by any one of fourth order, sixth order, eighth order Zernike spherical aberration-like terms, or combination thereof, wherein the spherical aberration component has a value of −0.5 diopter to about −1.5 diopters at a distance of 3 mm from the optical axis.

13. The series of toric contact lenses of claim 12, wherein each lens in the series is substantially free of optical power deviations.

14. The series of toric contact lenses of claim 12, wherein each lens in the series has power deviation of from about −0.5 diopter to about −1.5 diopters at a distance of 3 mm from the optical axis.

15. The series of toric contact lenses of claim 12, wherein, for each lens, power deviation at a distance of 3 mm from the optical axis is from about 0.2 diopter to about 1.0 diopter smaller than power deviations at a distance of 2 mm from the optical axis.

16. The series of toric contact lenses of claim 12, wherein the controlled optical power profile incorporates a spherical aberration component described by any one of fourth order, sixth order, eighth order Zernike spherical aberration-like terms, or combination thereof, wherein the spherical aberration component has a value of −0.5 diopter to about −1.5 diopters at a distance of 3 mm from the optical axis.

17. The series of toric contact lenses of claim 12, wherein the optical power deviation profile of each lens in the series are substantially rotationally-symmetric, wherein each lens having a targeted spherical optical power of from 0 to about 15 diopters is substantially free of optical power deviation; each lens having a targeted spherical optical power of from about −1.0 diopter to about −6.0 diopters has a power deviation profile mimicking that of a spherical lens with identical targeted spherical optical power; and each lens having a targeted spherical optical power of from about −6.0 diopter to about −15.0 diopters has a controlled optical power profile in which power deviation at a distance of 3 mm from the optical axis is from about 0.2 diopters to about 1.0 diopter less than the optical power deviation at a distance of 2 mm from the optical axis.

18. The series of toric contact lenses of claim 12, wherein all lenses in the series have one substantially identical power deviation profile in which power deviation at a distance of 3 mm from the optical axis is from about −0.5 diopters to about −1.5 diopters.

19. The series of toric contact lenses of claim 12, wherein all lenses in the series have a substantially identical power deviation profile in which power deviation at a distance of 3 mm from the optical axis is from about 0.2 diopters to about 1.0 diopter less than the power deviation at a distance of 2 mm from the optical axis.

20. The series of toric contact lenses of claim 12, wherein all lenses in the series have a substantially identical spherical aberration component which has a spherical aberration value of −0.5 diopter to about −1.5 diopters, preferably from about −0.8 diopters to about −1.1 diopters, at a distance of 3 mm from the optical axis.

21. The series of toric contact lenses of claim 12, wherein all lenses in the series have a substantially identical spherical aberration component in which spherical aberration value at a distance of 3 mm from the optical axis is from about 0.2 diopters to about 1.0 diopter smaller than that at a distance of 2 mm from the optical axis.

22. The series of toric contact lenses of claim 12, wherein the non-toroidal surface comprises a central circular area having a diameter of from about 2.0 mm to about 3.5 mm and an annular region surrounding the central circular area, wherein the central circular area and the annular region are concentric with the optical axis, wherein the non-toroidal surface and the toroidal surface combine together to provide a targeted cylindrical optical power to correct astigmatism vision errors and a multifocal spherical power to compensate for presbyopia.

23. The series of toric contact lenses of claim 12, wherein the toroidal surface is formed by defining a curve in the Y-Z plane and then rotating this curve around an axis parallel to the Y-axis from a distance r, wherein the Z-axis passes through the apex of the curve in normal direction, wherein the value of the distance r is selected based on the targeted cylindrical optical power, wherein the curve is defined by any mathematic function to provide the targeted spherical optical power.

24. The series of toric contact lenses of claim 23, wherein the curve is defined by Equation 1 or 2

$$z = \frac{cy^2}{1 + \sqrt{1 - (1+k)c^2 y^2}} \tag{1}$$

$$z = \frac{cy^2}{1 + \sqrt{1 - (1+k)c^2 y^2}} + \alpha_1 y^2 + \alpha_2 y^4 + \alpha_3 y^6 + \alpha_4 y^8 + \alpha_5 y^{10} + \alpha_6 y^{12} + \alpha_7 y^{14} \tag{2}$$

in which c is the curvature (the reciprocal of the radius), k is a conic constant and $\alpha_1$ to $\alpha_7$ are the coefficients. The value of the distance r can be selected to impart a desired cylindrical optical power to the contact lens for correcting astigmatism errors of an eye.

25. The series of toric contact lenses of claim 12, wherein the toroidal surface is defined by Equation 3

$$z = \frac{c_x x^2 + c_y y^2}{1 + \sqrt{1 - (1+k_x)c_x^2 x^2 - (1+k_y)c_y^2 y^2}} \tag{3}$$

where $c_x$ and $c_y$ are the curvatures at x and y meridians, $k_x$ and $k_y$ are conic constants, and Z-axis passes through the apex of the surface.

26. The series of toric contact lenses of claim 12, wherein the optical axis of a contact lens is the central axis which passes through the geometrical centers of the anterior and posterior surfaces.

27. The series of toric contact lenses of claim 12, wherein the optical axis coincides substantially with the line-of-sight (LOS) of an eye.

* * * * *